Patented Apr. 26, 1927.

1,626,044

UNITED STATES PATENT OFFICE.

FREDERICK S. MACY, OF BROOKLYN, NEW YORK.

ANTIDIABETIC SUBSTANCE.

No Drawing.    Application filed May 8, 1926.   Serial No. 107,792.

The present invention relates to a substance or substances to be administered to patients suffering from diabetes mellitus in order to correct the deranged metabolism which is characteristic of the disease and in which carbohydrates are inefficiently utilized by the body, thereby causing a derangement of the normal metabolism of proteins and fats as well as carbohydrates.

One object of the invention is to prepare from the pancreas of animals an anti-diabetic principle or hormone stable and free from deleterious substances and in such a form that it may be administered to the patient either internally or subcutaneously.

A further object of this invention is to assist the metabolic processes not only by a pancreatic extract but by a complementary substance extracted from muscles which when necessary is administered in conjunction with the pancreatic extract.

Experiments have shown that the pancreas contains a substance which lowers the blood sugar and diminishes or abolishes glycosuria. Diabetes mellitus causes a decreased production of this substance or hormone owing to a weakened condition of the pancreas which is a symptom of this disease and the object of this invention is to extract the hormone from the mammalian pancreas and administer it to the patients so that it may assist in the processes of metabolism which have been hindered due to the damaged pancreas.

It has also been found by observation that in patients suffering from diabetes mellitus, muscular exercise causes a decrease in blood sugar and glycosuria. From these facts it was found that normal metabolism is produced not only by the hormone of the pancreas but by a substance excreted from the muscles, which acts in interrelation with the pancreatic substance.

Thus in normal individuals both of these agents act collectively to produce perfect assimilation of carbohydrates whereas in diabetics the faulty metabolism may be caused by a diminishing or weakening of either of these substances, so that in treating the disease it may be necessary to administer either of these substances or both, dependent upon which agency is lacking in normal activity.

One of the anti-diabetic substances constituting the subject matter of this invention, is produced from the fresh pancreas of mammalia, preferably slaughter house animals, by a method which consists in two essential steps namely elimination of proteins and precipitation of the substances sought from the liquid remaining after the proteins have been removed.

The process for obtaining this substance may be briefly described by the following steps:

First step.

Fresh, clean pancreas tissue is crushed, minced or ground as finely as possible and placed in a suitable container. It is also desirable, but not essential, that fatty and fibrous tissue be first trimmed away.

The mass of ground tissue is then mixed with sufficient pure water to render the whole of a consistency easily poured or stirred. The absolute or relative amount of water added is unimportant and an excess is unobjectionable. The mixture of ground tissue and water is allowed to macerate for from four to eight hours in order that the soluble materials may be diffused through the water. It is not necessary to add any physiologic salt or solvent as sufficient are present already in the mixture.

It is well known that pancreas tissue develops certain destructive ferments almost immediately after death, but these seem to have no marked effect upon the substance described herein, which can still be obtained from the tissue several days after death especially if the material is kept in a cold place such as an ordinary refrigerator or ice box.

The proteins are next removed by any convenient method or combination of methods. An excellent one consists in adding ammonium sulphate either in the solid state or in aqueous solution with sufficient stirring to cause diffusion throughout the mixture, continuing the addition of ammonium sulphate until masses of jelly form. The whole is then brought to the boiling point if desired, to complete coagulation, the essential of the step being the separation of coagulable albuminous or protein substances. The mass is then filtered to remove the solids. The filtrate should be perfectly clear, limpid and colorless if the preceding measures have been carried out properly. This filtrate contains the substance sought.

Second step.

To the clear filtrate referred to above is now added an alkaline hydroxid, carbonate ammonia or similar reagent known to precipitate bases in general. Ammonia is most convenient, as it precipitates the substance sought very rapidly, thoroughly and with a minimum quantity of reagent. A white or pearly precipitate forms immediately, translucent or opalescent in appearance, rapidly and in globules if the substance is in abundance, more slowly and diffuse if dilute. In neither case is it redissolved by excess of the reagent, nor is the quantity or the concentration of the reagent important.

The two steps above described yield a precipitate which is the substance sought. This should be removed by decantation, filtration or other convenient means, washed thoroughly and dried. The result is a light, fine, dry powder, white in color, tasteless or slightly saline, insoluble in water and in alcohol, but freely soluble in acids of any concentration with which it forms salts.

The substance is precipitated completely from solutions of its salts by the addition of alkalies, carbonates, ammonia and other hydroxids, and is insoluble in excess of these reagents. It is also insoluble in very weak dilutions of them. It does not give the biuret or other reactions commonly characteristic of proteins, though it is precipitated by tungsten salts. It does not respond to the ordinary tests for ferments and is not impaired by exposure to the boiling point of water. The salts may be obtained in crystalline form but with great difficulty, since they are highly deliquescent. The chlorid crystalizes in form resembling the oxalate of lime, except that the center of the outline, as seen under the microscope, is truncated.

The cardinal characteristic of this substance and its salts is that it causes the complete disappearance of dextrose from a solution of that substance, but only and invariably if fresh muscle juice be present also. For example, if 4 cc. of a .1% solution of dextrose in water be placed in a test tube and there be added six drops each of a conveniently concentrated solution of a salt of the substance herein described together with six drops of the red juice expressed from fresh, unrefrigerated beef, and the whole incubated at body temperature for several hours, over night for example, it will be found that the dextrose has entirely disappeared. Benedict's solution is preferred for the test as it is not reduced by other substances than dextrose. But if either the pancreatic substance herein described or the muscle juice be omitted, there will be no appreciable change in the sugar content of the dextrose solution.

Physiologically this substance produces in certain diabetics a prompt increase in strength and a sense of well-being, with or without diminution or disappearance of urinary sugar, or reduction of blood sugar, according to circumstances, especially if the patient be also affected with a disturbance of the thyroid gland.

Purification of the crude precipitate obtained is best accomplished by solution of the substance as a salt, reprecipitation and re-solution, repeated as desired. A pink discoloration caused by contamination with blood coloring matter, if it be present, can be removed by washing with water and alcohol alternately.

At present there are several substances derived from the pancreas which are used in the treatment of diabetes mellitus but all of these substances are obtained by different means, and differ in their composition and chemical construction from that described herein.

This difference is shown most clearly by chemical reactions, especially in its reaction with dextrose. The substance which is the subject of this invention is a basic or elementary and active principle of the pancreas and is therefore functional; that is it is different from any other substance heretofore isolated, in that it requires the presence of a complementary substance formed in muscle in order to reduce dextrose in test tubes, and is therefore the only substance known that demonstates the presence of such a substance in muscle or of such a process in metabolism; and that it is found in identically the same state of activity in urine, thus demonstrating its entity as a specific product and not a mixture of substances with proteins.

The advantages of this substance are that it is stable, solid and can produce desirable physiological effects, that it presents a starting point for the study of facts not heretofore known, and that it can be Pasteurized without impairment of activity. The advantage of the process, aside from the fact that it produces the particular substance, lies in its simplicity.

Although in the foregoing certain components and reagents have been defined as best adapted to perform the functions allotted to them, nevertheless it is to be understood that various minor changes may be resorted to within the scope of the appended claims without departing from or sacrificing any of the principles of this invention.

Having described my invention, what I claim as new and wish to secure by Letters Patent is:

1. A method of preparing an anti-diabetic substance from the pancreas consisting in grinding and macerating the tissue, precipitating the proteins therefrom with ammonium sulphate, separating the precipitate from the solution by filtration, obtaining a precipitate from the filtrate by means of ammonia and combining said precipitate with the red juice expressed from muscles of fresh unrefrigerated beef, whereby a substance is produced which acts to reduce dextrose.

2. A method of preparing an anti-diabetic substance from the pancreas consisting in grinding and macerating the tissue, precipitating the proteins therefrom with ammonium sulphate, separating the precipitate from the solution by filtration, obtaining a precipitate from the filtrate by means of ammonia, removing the precipitate from the solution by filtration, drying and then combining the dried precipitate with red juice expressed from muscles of fresh unrefrigerated beef, whereby producing a substance which acts to reduce dextrose.

3. A method of preparing an anti-diabetic substance from the pancreas consisting in grinding and macerating the tissue, precipitating the proteins therefrom with ammonium sulphate, separating the precipitate from the solution by filtration, obtaining a precipitate from the filtrate by means of ammonia, removing the precipitate from the solution by filtration, drying and then combining the dried precipitate with red juice expressed from muscles of fresh unrefrigerated beef, to produce a substance free from deleterious matter and which when administered either internally or externally relieves the diabetic syndrome.

4. An anti-diabetic substance embodying a principle or hormone derived from the pancreas and a complementary substance obtained from the muscles which when administered either internally or subcutaneously acts in inter-relation with the principle or hormone to relieve the diabetic syndrome.

5. An anti-diabetic substance embodying a principle or hormone derived from the pancreas and a complementary substance obtained from the muscles which when combined in predetermined proportions with the principle or hormone and administered either internally or subcutaneously acts in inter-relation with the principle or hormone to relieve the diabetic syndrome.

6. An anti-diabetic substance embodying a principle or hormone derived from the pancreas and a complementary substance obtained from the muscles which when administered either internally or subcutaneously acts in inter-relation with the principle or hormone to relieve the diabetic syndrome.

7. An anti-diabetic substance embodying a principle or hormone derived from the pancreas and a complementary substance obtained from the muscles which when combined in predetermined proportions with the principle or hormone and administered either internally or subcutaneously relieves the diabetic syndrome.

FREDERICK S. MACY.